United States Patent [19]

Markus et al.

[11] Patent Number: 5,440,396
[45] Date of Patent: Aug. 8, 1995

[54] VIDEO COMPARATOR SYSTEM

[75] Inventors: Richard Markus, Bridgeport; Manfred Deimold, North Haven, both of Conn.

[73] Assignee: United States Surgical Corporation, Norwalk, Conn.

[21] Appl. No.: 36,931

[22] Filed: Mar. 25, 1993

[51] Int. Cl.6 .............................................. G01B 11/00
[52] U.S. Cl. .................................... 356/394; 348/130
[58] Field of Search ............... 356/391, 392, 393, 394; 348/129, 130

[56] References Cited

U.S. PATENT DOCUMENTS

| | | |
|---|---|---|
| 2,989,891 | 6/1961 | Rockafellow . |
| 3,114,797 | 12/1963 | Williams . |
| 3,178,510 | 4/1965 | Rosin et al. . |
| 3,211,052 | 10/1965 | Cottesmann . |
| 3,261,967 | 7/1966 | Rosin et al. . |
| 3,488,498 | 1/1970 | Glowa et al. . |
| 3,597,093 | 8/1971 | Wolf . |
| 3,695,769 | 10/1972 | Mason . |
| 3,889,056 | 6/1975 | Mayer, Jr. et al. . |
| 4,389,669 | 6/1983 | Epstein et al. ................ 356/394 |
| 4,725,968 | 2/1988 | Baldwin et al. . |
| 4,760,444 | 7/1988 | Nielson et al. ................ 348/129 |
| 4,823,396 | 4/1989 | Thompson ................... 348/130 |
| 4,911,543 | 3/1990 | Hodgson . |

*Primary Examiner*—F. L. Evans

[57] ABSTRACT

A comparator is disclosed for examining, inspecting and/or calibrating component parts. The comparator includes a frame, a component supporting system releasably attached to the frame for supporting a component part to be inspected and/or calibrated, a video imaging system attached to the frame for generating a video image of the component part on a video display, a graphic line image generator for superimposing on a video display graphic images arranged to display and represent predetermined dimensional ranges related to the component part, whereby the component part may be compared to the predetermined images of the graphic images.

49 Claims, 9 Drawing Sheets

VIDEO COMPARATOR SYSTEM

BACKGROUND OF THE INVENTION

1. Field of the Invention

The invention relates to an apparatus for inspecting and adjusting a manufactured or component part. More particularly, the invention relates to a video comparator system which facilitates such inspection and/or adjustment of components.

2. Description of the Prior Art

In many intricate devices which are fabricated by assembling a plurality of components together, there is generally a requirement that the dimensions of the component parts be within certain tolerances in order to assemble the overall device for proper operation.

Up to the present examination or inspection and calibration of component parts have been accomplished with optical comparators. Generally, these comparators impinge a beam of light on a component part to be inspected. A projecting and magnifying lens system then provides a magnified image of the component part on a viewing screen. The master outline is positioned on the viewing screen or within the focal plane of the lens system, so that the component part image can be measured against the master outline. The component part either satisfies the inspection requirements or is recalibrated by visually measuring the magnified image of the component part against a master outline of the component part.

Fundamentally, these types of comparator systems are based on measuring the dimensions of the component part against those of the master outline. The result is that the operator must make one or more measurements for each component part being examined, inspected and/or calibrated thereby causing or enhancing the operator's fatigue and increasing inspection or calibration time. Further, current comparator systems have optical systems which are not firmly secured to the structure which holds the component part. Thus present comparator systems must be realigned each time the operator leaves the work station for a period of time, or each time the system is moved either intentionally or accidentally. Failure to do so may result in inaccurate measurements and ultimately in increased failure rates for the device in which the component part is installed.

It can be seen, that current comparator technology is mechanically unstable, thereby, requiring the operator to realign the system periodically. In addition, current comparator systems are ergonomically inefficient causing operator fatigue by requiring the operator to make dimensional measurements for each component part and if necessary to re-calibrate the component part being inspected.

Therefore, there exists a need for a new comparator system which overcomes the drawbacks of existing comparators by requiring the operator to merely compare the dimensions of the component part to a reference pattern, thereby relieving the operator from making any measurements. Further, the need for a stable comparator system which eliminates the need for periodic realignment after initial set-up is demonstrated. Lastly, a need exists for a comparator which allows the operator to adjust the component part to predetermined dimensions to coincide with the reference pattern.

SUMMARY OF THE INVENTION

The present invention relates to a video comparator system for inspecting and calibrating a component part, which comprises frame means, means releasably attached to the frame means for supporting a component part, video imaging means attached to the frame means for generating a video image of the component part on video display means, and means for generating graphic images having at least one horizontal line or bar and at least one vertical line or bar, to be superimposed on the video display means. The graphic images are arranged to display and represent predetermined dimensional ranges related to the component part, whereby the component part may be compared to the predetermined images of the graphic images.

In the preferred embodiment, the video imaging means includes a video camera, a lens assembly having magnification means for focusing said video image and illumination means for illuminating the focal plane of the lens assembly.

Preferably, the frame means is of unitary construction and significantly rigid to maintain the component securing means and the video imaging means in continuous fixed relationship. For example, the frame means may comprise a base member having at least two upright side walls spatially secured thereto and an upper platform secured to said side walls.

It is also preferred that the component supporting means comprise a first member, component holding means secured to the first member for receiving at least a part of the component part, adjusting means secured to the first member for adjusting the dimensions of the component part to coincide with the predetermined dimensional ranges. An intermediate member is positioned between the lower member and the component holding means and is also positioned between the lower member and the adjusting means, and positioning means is secured to the first member for positioning the component part within the focal plane of the imaging means.

In an alternative embodiment, the video comparator system includes a frame, imaging means secured to the frame for generating a video image, line generating means connected to the imaging means for superimposing a graphic line image on the video image thereby generating a composite image, data entry means connected to the line generating means for altering the graphic line image, video display means connected to the line generating means for receiving the composite image. Component support means is releasably secured to the frame for releasably supporting a component part and for positioning the component part within the focal plane of the imaging means such that the video display means displays the component part.

Preferably, the imaging means includes a video camera, a lens assembly attached to the video camera having a magnification means for focusing the video image, and illumination means for illuminating the focal plane of the lens assembly to facilitate image reception by the imaging means and display of the image on the video display means.

The data entry means is preferably in the form of a keypad, and includes keys adapted for controlling the up and down movement of at least one horizontal line image, and keys adapted for controlling the left and right movement of at least one vertical line image, and menu select means. Also, the images may be in the form of lines and bars.

The magnification means of the present invention includes a magnification lens of approximately at least 0.5, 0.67 or 6.5 magnification or any combination thereof, while the illumination means which is preferably connected to the lens assembly includes a light source, a ring light for dispersing light generated by the light source and an optical cable for transmitting light from the light source to the ring light.

In another embodiment, the video comparator system of the present invention includes a frame, imaging means secured to the frame for generating a video image, enhanced line generating means secured to the frame for superimposing graphic line and bar images on the video image thereby generating a composite image. Data entry means is connected to the enhanced line generating means for altering the graphic line and bar images, and display means is secured to the frame for receiving the composite image and component support means releasably secured to the frame for releasably supporting a component part and for positioning the component part within the focal plane of the imaging means such that the display means displays the component part. Preferably, the graphic line and bar images include at least one vertical bar, at least one vertical line, at least one horizontal bar and at least one horizontal line.

The invention also relates to a method of displaying component parts for examination, inspection and/or calibration purposes, comprising generating a reference pattern from a setting master, releasably securing a component part to component support means, comparing the dimensions of the component part with the reference pattern, and adjusting the dimensions of the component part to coincide with the reference pattern.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

In general, the present invention is directed to a video comparator system for examining or inspecting and/or calibrating component parts prior to assembly into the final manufactured device for which they were intended. However, it is also contemplated that the video comparator system of the present invention may be used to examine, inspect and/or calibrate the device after manufacture. Such calibration provides visual comparison to a standard device or part while facilitating in-situ adjustment of the device or component part prior to removal from the component support fixture which forms part of the component support system.

In the description which follows, straight line images are disclosed to represent relevant dimensions of component parts to be examined, calibrated and/or adjusted. It is however, contemplated within the scope of the invention to utilize images which, for example, are non-linear or compound or even curved or other images which depend upon the specific component part being examined, calibrated and/or adjusted.

Figure 1:
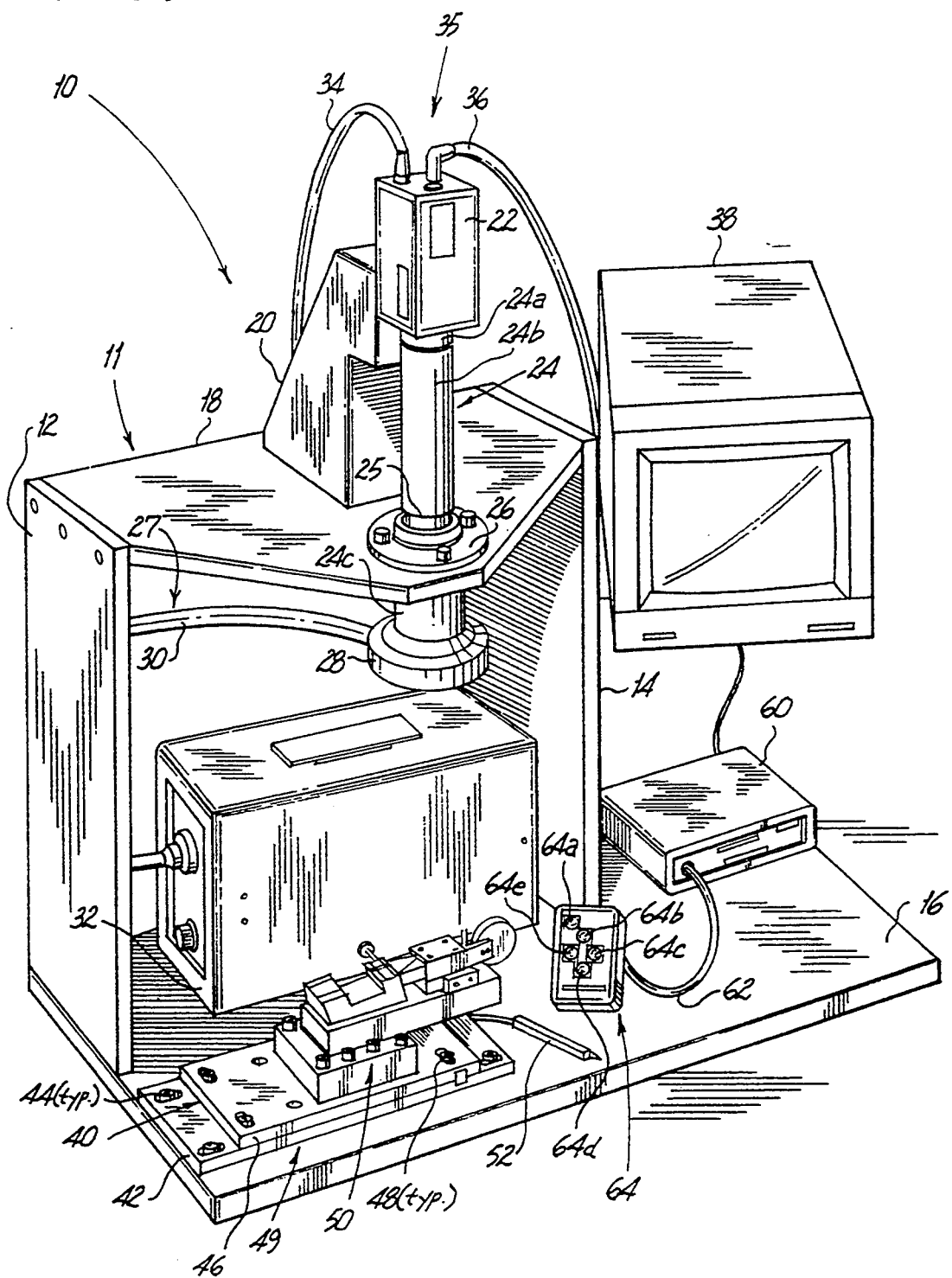
FIG. 1 is a perspective view of an embodiment of the present invention illustrating a line generating system attached to the base of the comparator of the present invention.

Referring to the Figs., in particular FIG. 1, the video comparator system of the present invention is generally indicated by the numeral 10. Generally, the comparator system includes: 1) a frame, 2) an imaging system secured to the frame for generating video images, 3) a line generating system secured to the frame for superimposing graphic line and/or bar images on the video images thereby generating a composite image, 4) a data entry device connected to the line generating system for altering the graphic line image; 5) a display monitor connected to the line generating system for receiving the composite image; and 6) a component support system releasably secured to the frame for receiving component parts or setting masters and for positioning the component parts or setting masters within the focal plane of the imaging system so that the display monitor displays the component parts or setting masters.

In the preferred embodiment shown in FIG. 1 the frame 11 is of two tier unitary construction which is of sufficient rigidity to support the various components and subsystems in predetermined fixed relationship with each other as will be explained in further detail.

Referring to FIG. 1, frame 11 includes base 16 which forms the lower tier and has two side walls 12 and 14 spatially secured thereto. Upper plate 18 is secured to the top of side walls 12 and 14 which forms the upper tier. In the embodiment of FIG. 1, base 16 supports line generator system 60, component support system 49 and light source 32. The upper plate 18 supports imaging system 35 and side wall 14 supports the display monitor 38 as shown. It should be understood that the configuration of the embodiment in FIG. 1 is an exemplary illustration of numerous ways which can be utilized to support the various elements of the present invention. For example, only the imaging system 35 and the component support system 49 may be supported by the frame while the remaining elements or sub-systems may be supported by other than the frame. A significant feature in such instance is that the component support system 49 and imaging system 35 are secured to the same rigid structure. This feature facilitates positioning of a component part which is releasably secured to the component support system 49 within the focal plane of the imaging system 35 and causes the component part to remain within that focal plane thereby obviating the need for periodic realignment.

Figure 2:
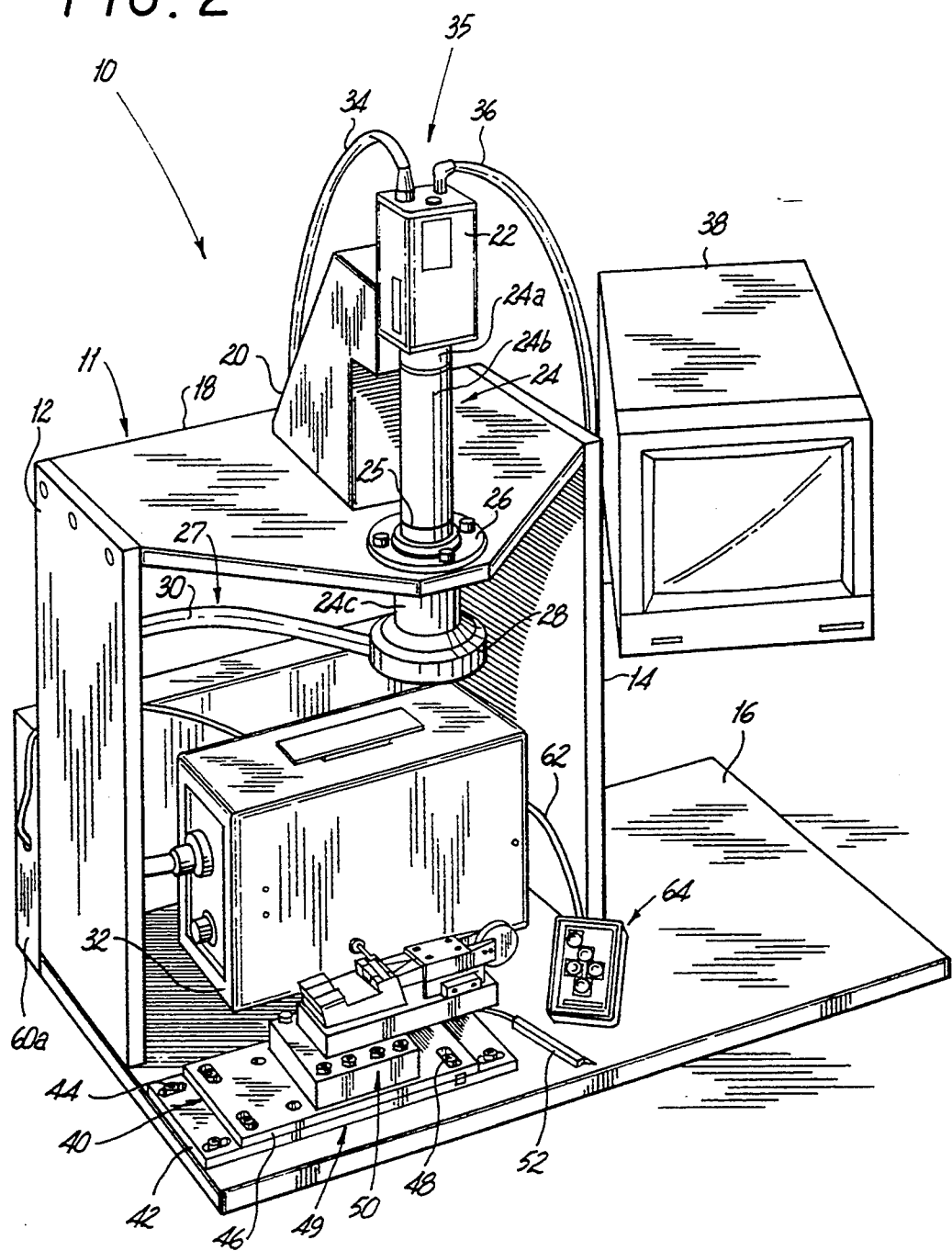
FIG. 2 is a perspective view of an alternative preferred embodiment of the present invention illustrating an enhanced line generating system attached at the rear of the comparator of the present invention.

The imaging system 35 generally includes video camera 22, lens assembly 24 and illumination system 27. Video camera 22 is attached to lens assembly 24 and illumination system 27 and the entire assembly is secured to upper plate 18 of the frame so that the focal plane of imaging system 35 is in the direction of base 16 and parallel thereto. Preferably, bracket 20 is affixed perpendicularly to upper plate 18 and to video camera 22 so as to secure camera 22 to the upper plate, while support flange 26 firmly secures lens assembly 24 to the upper plate, as shown in FIGS. 1 and 2. The video camera 22 may be any suitable type of video camera known in the art, for example, the Javelin Chromachip Camera manufactured by Javelin Electronics.

The lens assembly 24, shown in FIG. 1, includes adapter 24a which connects camera 22 to lens assembly 24, a lens or fixed magnification adapter 24b or adapters and a zoom lens 24c, to clearly display the component part or setting master. Alternatively, lens assembly 24 may be an automatic magnification adjustment lens, or lens assembly 24 may be a manual magnification adjustment lens. An example of a suitable lens assembly 24, as shown in FIGS. 1 and 2, includes the following elements: 1) adapter 24a (model 6010 manufactured by D.O. Industries) connected to video camera 22; 2) 0.67 times magnification lens 24b (model 6020 manufactured by D.O. Industries) secured within adapter 24a; 3) zoom lens 24c (6.5 zoom, series 6000 manufactured by D.O. Industries) connected to 0.67 times magnification lens 24b at hub 25; and 4) 0.5 times magnification lens (not shown) (model SLAO manufactured by D.O. Industries) secured within zoom lens 24c. It should be understood, however, that if a fixed magnification adapter or adapters are utilized to display a component part, proper focusing of the component part requires that the component part be positioned from the imaging system a fixed distance. For example, if the combination lens assembly described above is utilized, the distance required between hub 25 and the component part to properly focus the component part is 10.75 inches.

Referring again to FIGS. 1 and 2, illumination system 27 may be any known source of light which sufficiently illuminates the focal plane of the lens assembly 24. Preferably, the illumination system includes light source 32, ring light 28 for dispersing the light generated by light source 32 and optical cable 30 for distributing or transmitting the light generated by light source 32 to ring light 28. Illustrative of a satisfactory illumination system is the model FO-150 manufactured by Fostic Corporation.

As noted above, preferably video camera 22 and lens assembly 24 are positioned on upper plate 18 of frame 11, so that lens assembly 24 is directed toward base 16 of the frame, as illustrated in FIG. 1. As a result, the focal plane of the imaging system is in the direction of and parallel to base 16. The imaging system 35 generates a video signal of any object within the focal plane of lens assembly 24. The video signal is then transferred to line generating system 60 via cable assembly 36. Preferably, the cable assembly is a 75 ohm coaxial cable having BNC connectors on each end thereof. However, any type of cabling or electrical transmission devices known in the art may be used to transfer the video signal to the line generating system.

The line generating system 60, shown in FIG. 1, superimposes vertical lines and/or horizontal lines onto the video signal. Preferably, four vertical lines and/or horizontal lines are superimposed on the video signal. Line generating systems that superimpose vertical and horizontal lines are known in the art, one such example is the Oracle JV3400 manufactured by Javelin Electronics. In a preferred embodiment enhanced line generating system 60a is utilized, as shown in FIG. 2. The enhanced line generating system 60a is one capable of generating vertical lines and bars, and horizontal lines and bars. These vertical and horizontal lines may be rotated a maximum of 180 degrees around the horizontal or vertical axis depending upon the original orientation of the lines. Enhanced line generating systems of the type described above include video graphic printed circuit boards in conjunction with a microprocessor and memory, and programmed with conventional programming techniques, all of which are within the knowledge of those skilled in the art. It should be noted that any discussion about the line generating system includes the interchangability with the enhanced line generating system.

Referring once again to FIGS. 1 and 2, data entry device 64 is connected to either line generating system 60 or enhanced line generating system 60a via data link 62. The data entry device may be any form of keyboard or other user interface which is known in the art. For example, the data entry device may be a keypad having five keys thereon, one menu and four arrow keys (left, right, up and down), similar to the JV HAND model manufactured by Javelin Electronics.

Generally, data entry device 64 allows the operator to move the vertical and horizontal lines and/or bars, or to rotate the lines, in order to create an image of preapproved structural characteristics. These characteristics are based on a setting master and are utilized for later comparison with component parts. For example, data link 62 may be a six wire cable with jack assemblies at each end allowing easy disconnection of the data link 62 from either line generating system 60 or 60a or the data entry device.

Continuing to refer to FIGS. 1 and 2, line generating system 60 receives the video signal and superimposes graphic lines onto the video signal so as to create a composite image. The composite image is then transmitted via any cable assembly or electrical transmission device known in the art to display monitor 38 which displays the composite image. Preferably, the cable assembly is a 75 ohm coaxial cable having BNC connectors on each end thereof. However, any type of cabling or electrical transmission devices known in the art may be used to transfer the composite image to the display monitor. The display monitor 38 may be any suitable medium to display the composite image, such as the Javelin CVM9 monitor.

Component support system or jig 49 provides an adjustable system which facilitates positioning of the setting master or the component part within the focal plane of imaging system 35. In addition to facilitating the positioning of the component part, the component support system 49 may also be configured to provide the necessary height differential required by fixed magnification lenses, as noted above. Component support system 49 generally includes support fixture 50 and adjustable positioning system 40, shown in FIGS. 1 and 2.

Figure 3:
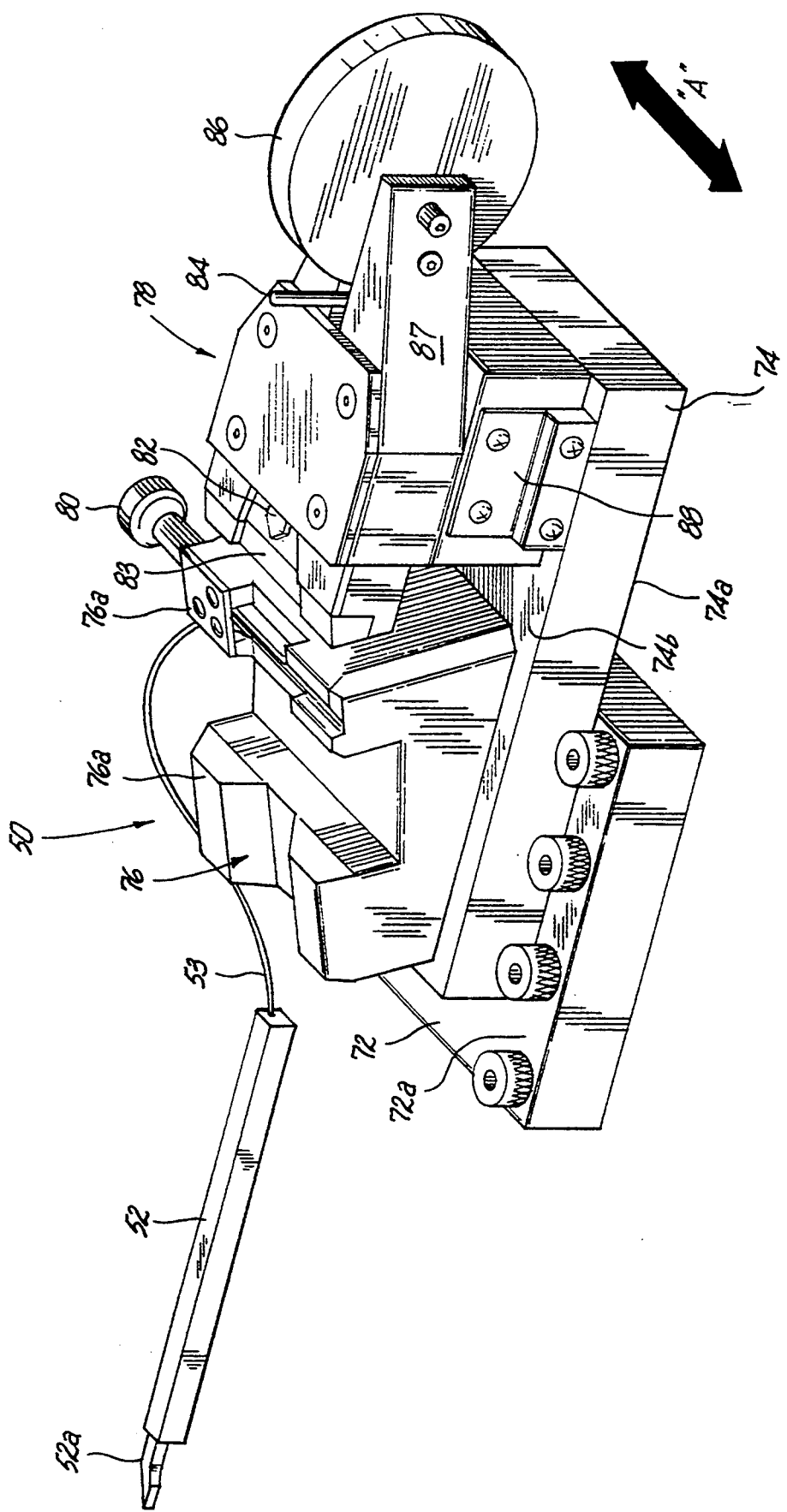
FIG. 3 is a perspective view of a component support fixture and a setting master for establishing the dimensions of the component part to be examined.

Referring now to FIG. 3, there is illustrated a support fixture 50 for supporting a component part or setting master and utilized for examining, inspecting and/or calibrating component parts. Generally, the support fixture may be a universal holder for numerous types of component parts which releasably secures the component parts thereto and is capable of being positioned within the focal plane of the imaging system. Preferably, the support fixture 50 is configured to house a single type of component part and its associated setting master 52, as shown in FIG. 3. It is also preferred that support fixture 50 have at least one adjusting system 78 secured thereto which facilitates adjusting of the component part to fall within the predetermined dimensions of the setting master. Ultimately, the dimensions of the support fixture are dependent on the dimensions of the type of component parts being examined, inspected and/or calibrated and the type of lens assembly being utilized. In the preferred embodiment, support fixture 50 includes lower member 72, intermediate member 74 secured at least partially to lower member 72, component holding member 76 secured to intermediate member 74, and adjusting system 78 also secured to the intermediate member 74.

As shown in FIG. 3, the support fixture 50 includes lower member 72 which is a square plate-like member positioned horizontally and having upper surface 72a, intermediate member 74 which is a rectangular plate-like member having a width which is less than the width of the lower member 72. The intermediate member 74 is positioned so that its lower surface 74a is adjacent to upper surface 72a of lower member 72 and is partially secured thereto. Component holding member 76 is secured to upper surface 74b of intermediate member 74 and is configured to at least partially retain the component part or setting master 52. Further, the component holding member 76 includes a retaining device 80 which releasably secures the component part or setting master to the component holding member 76. Retaining device 80 may be a slidable pin or bar which firmly positions the component part or setting master 52 between component holding member 76 and the pin or bar. As other examples, the retaining device may be any other releasable form of clamp, clasp, grip, vice, clip, or the like which will releasably secure a component part or setting master to the component holding member 76.

Referring once again to FIG. 3, adjusting system 78 may be slidably secured to upper surface 74b of intermediate member 74. Adjusting system 78 reciprocates in a direction which cause the dimensions of the component part to be permanently altered, as indicated by arrow "A" in FIG. 3. The adjusting system 78 includes guide member 88 secured to upper surface 74b of intermediate member 74, and slide arm 87 which is slidably secured to guide member 88. Adjusting system 78 also includes first lever arm 86 secured thereto which facilitates the reciprocating motion of the adjusting system 78. Additionally, the adjusting system 78 may further include reciprocating flange 82 which is operatively connected to second lever arm 84 and utilized to permanently alter the dimensions of the component part.

Adjusting system 78 and component holding member 76 are positioned on intermediate member 74 and secured thereto so that either the component part or setting master is coincident with the adjusting system 78.

As illustrated in FIG. 3, the component holding member 76 has an upper surface 76a which is generally shaped as an inclined plane. The upper-most end of the upper surface 76a is positioned adjacent to recess 83 of the adjusting system 78 so that one end of the component part (not shown) can extend beyond the component holding member 76 into recess 83. However, this configuration of the component holding member is only exemplary, generally, the construction of the component holding member is dependent on the component part to be examined, inspected and/or calibrated.

Figure 4:
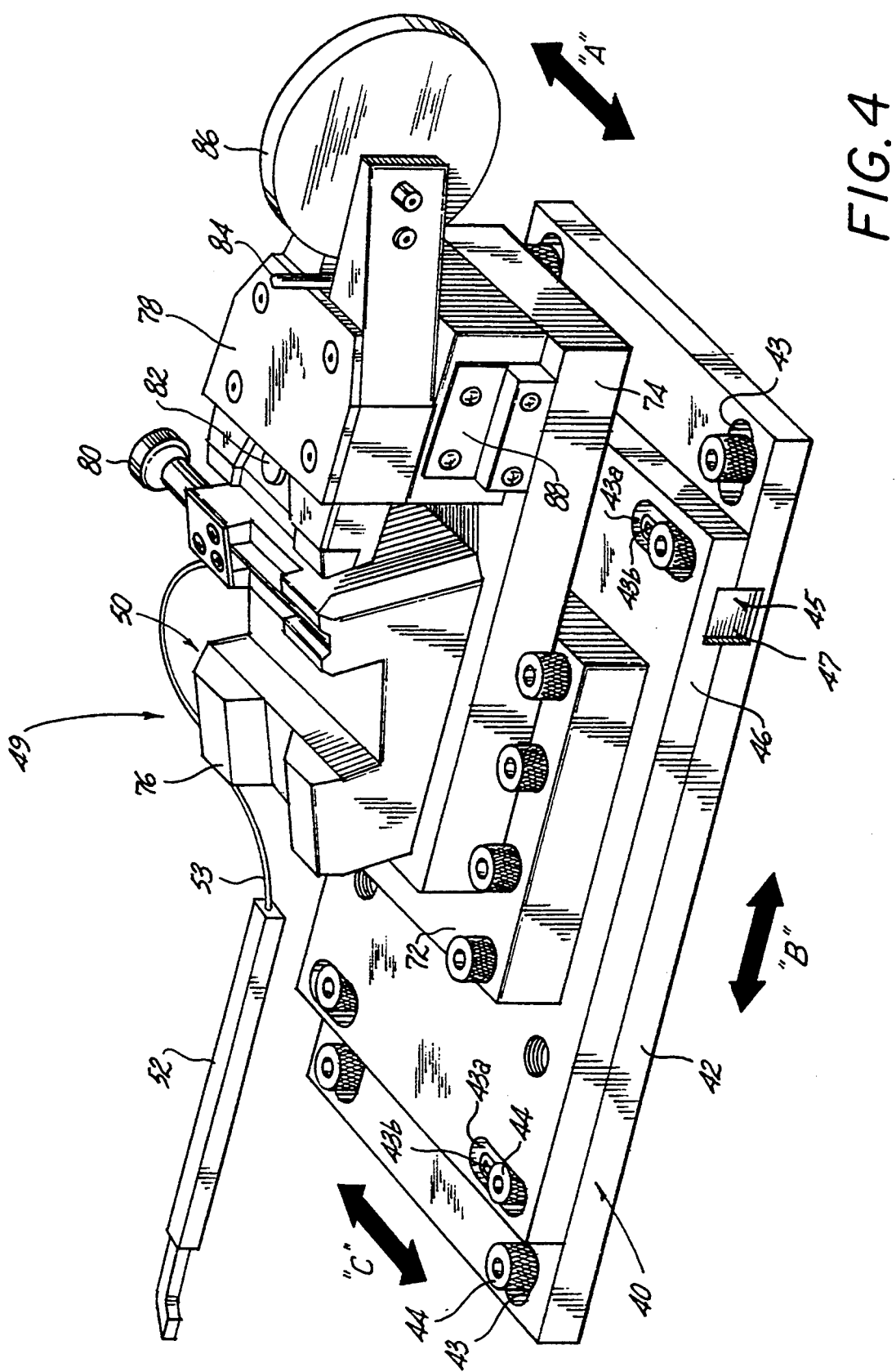
FIG. 4 is a perspective view of the component support fixture of FIG. 3, secured to an adjustable positioning system.
Figure 5:
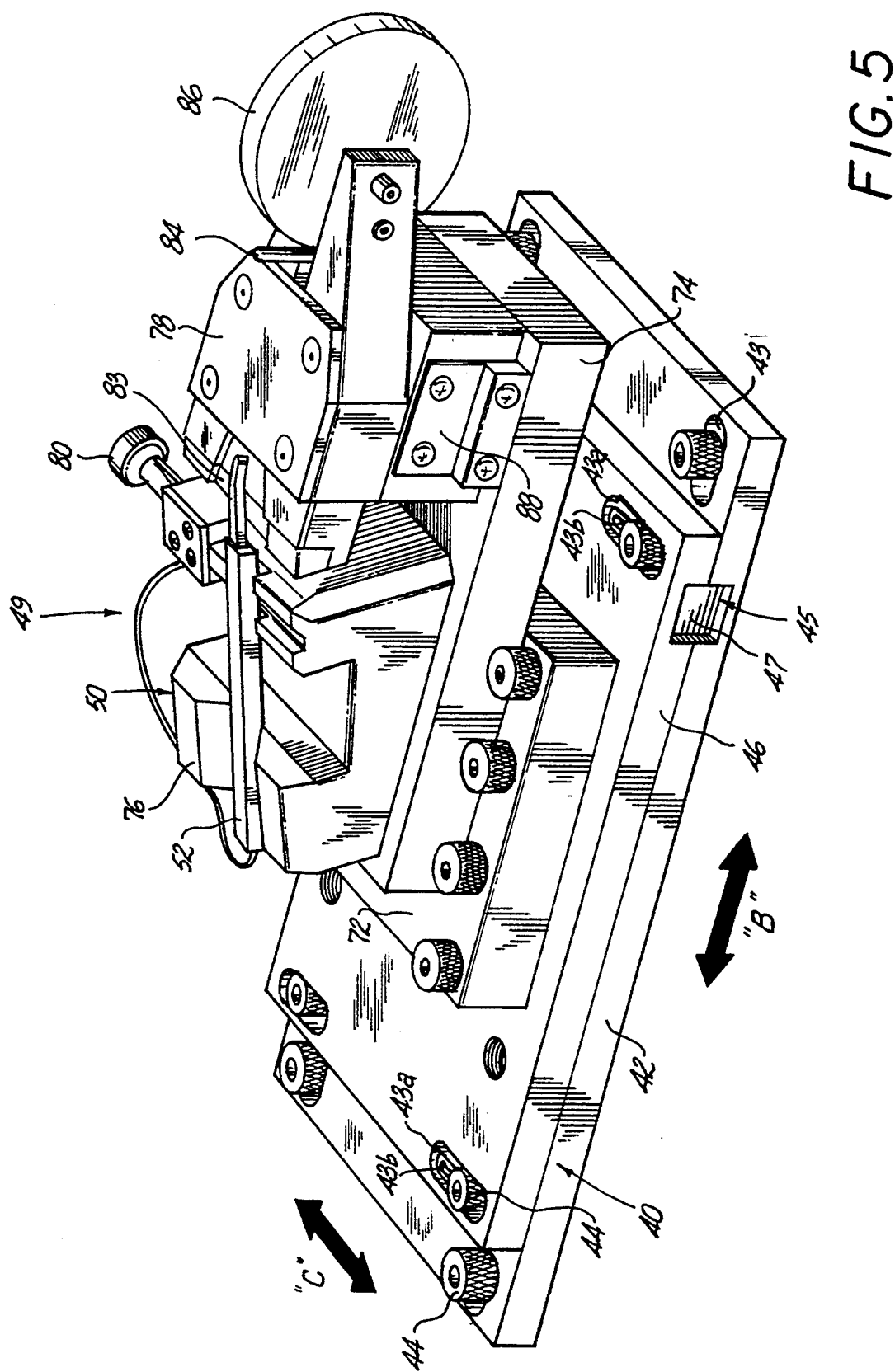
FIG. 5 is a perspective view of the component support fixture of FIG. 3, illustrating the setting master in position for initially setting the graphic line images for inspection of a component part.

Turning to FIG. 4, adjustable positioning system 40 may be a single structure which is slidably secured to the base 16, or it may be made of more than one structure which facilitates positioning of the component support fixture 50. In particular, adjustable positioning system 40 has two rectangular plate-like structures positioned in adjacency. Upper plate 46 has a length which is less than the length of the lower plate 42. Lower plate 42 includes an elongated aperture 43 at each corner as shown to allow lower plate 42 to be secured to base 16 by set screws 44. Elongated apertures 43 are arranged to allow longitudinal movement of lower plate 42 along the base 16, as indicated by arrow "B" in FIG. 4. Elongated apertures 43 in lower plate 42 extend through the thickness of the plate to permit the head of each set screw 44 to engage the upper surface of plate 42 as shown. Upper plate 46 also includes an elongated aperture 43a at each corner to allow upper plate 46 to be secured to lower plate 42 by set screws 44. As can be seen in FIGS. 4 and 5, for example, elongated apertures 43a in upper plate 46 extend partially into the plate and further include a second aperture 43b of width less than aperture 43a so as to define a shelf for engagement by set screw 44. Elongated apertures 43a and 43b in upper plate 46 are arranged to allow movement of upper plate 46 transverse to the movement of lower plate 42 as indicated by arrow "C" in FIG. 4. Guide key 45 is positioned within channels 47 formed in each plate to assist in fixing the positioning of the plates with respect to each other by aligning the half portions with each other.

The support fixture 50 is releasably secured to the base 16 at a location whereby the component part is within the focal plane of the imaging system 35. In the preferred embodiment component support system 49 is utilized, wherein support fixture 50 is releasably secured to adjustable positioning system 40 which facilitates positioning of the support fixture 50 within the focal plane of the imaging system 35, as shown in FIGS. 1 and 2.

In operation, a reference pattern is generated by releasably securing a setting master to the component support system, positioning the setting master within the focal plane of the imaging system, and superimposing line and/or bar images to outline the specific dimensional characteristics of the setting master.

Figure 6:
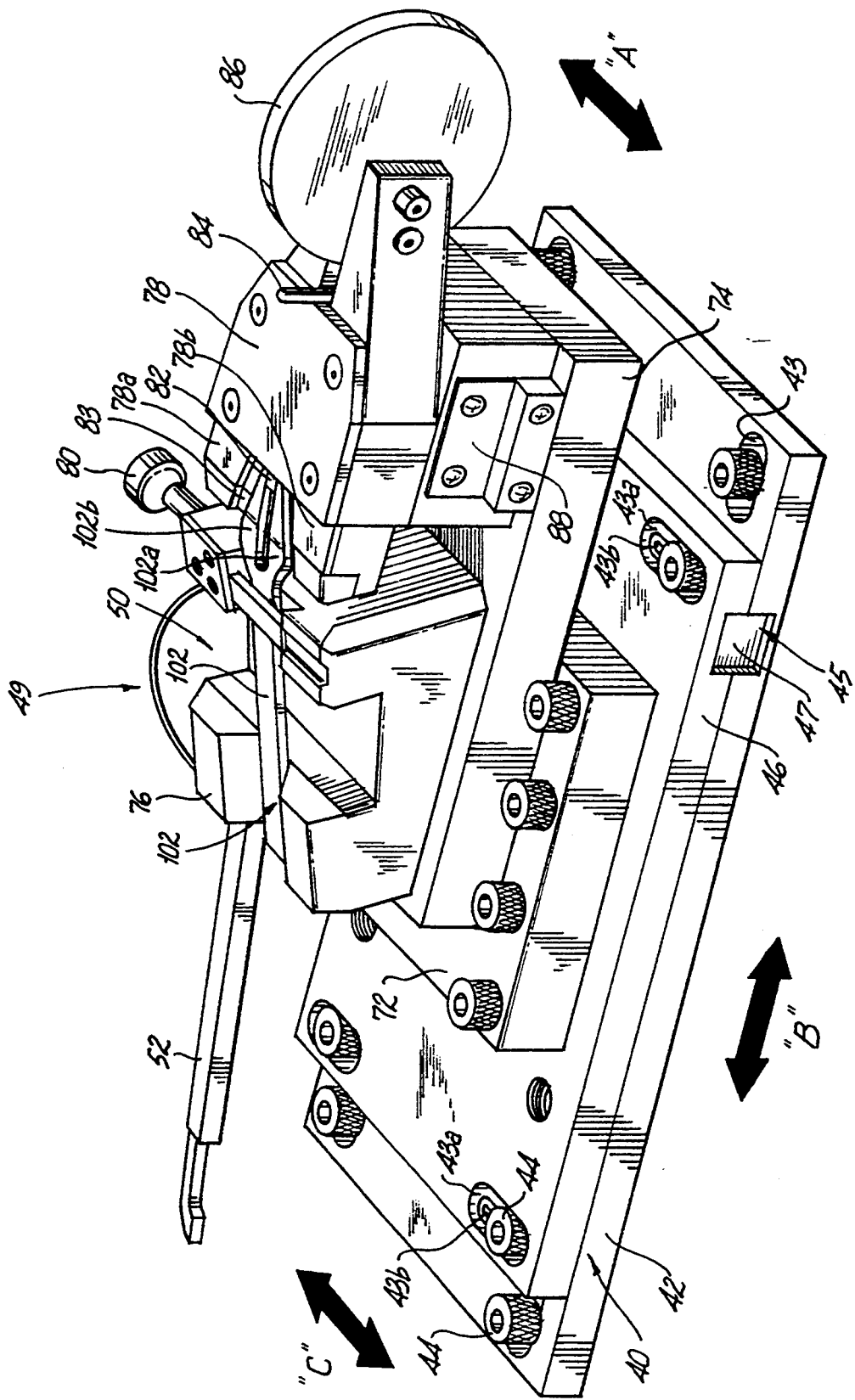
FIG. 6 is a perspective view of the component support fixture of FIG. 3, illustrating a typical exemplary manufactured component part in position for inspection.

Referring once again to FIG. 3, in conjunction with FIGS. 4 and 5, the setting master 52 is configured to conform to the dimensions of the specific component part which will be examined, inspected and/or calibrated. As an example, the setting master 52 is configured to have a distal end 52a to represent the spacing between the jaws 102 of the component part, as shown in FIGS. 5 and 6. The setting master 52 is fabricated from a metallic, plastic or any other rigid material sufficient to retain the desired shape. For convenience and availability, the setting master 52 is preferably attached to the component support fixture 50 by a cable, wire, string or any other suitable device.

Once the setting master 52 is secured to the component support system 49 by retaining device 80, as shown in FIG. 5, the horizontal and vertical graphic lines superimposed onto the video signal are positioned to represent the image of the setting master. If the enhanced line generating system is utilized, the horizontal and vertical graphic lines and bars may be superimposed onto the video signal which represents the image of the setting master. Data entry device 64, shown in FIG. 1, facilitates the generation of either the vertical or horizontal graphic lines or both and enables the operator to move the graphic lines in the horizontal or vertical direction depending on the orientation of the original line.

Referring again to FIG. 1, depressing the menu key 64a on the data entry device 64 will visually display the menu for the graphic line generating system on display monitor 38. The menu may list the different selections for controlling the graphic lines. For example, the Javelin Electronics Oracle JV3400 menu may indicate the following functions:

Vertical
Horizontal
Vertical:Horizontal
Datum
Span 1
Span 2
Span 3
Move all
Line type
Matt, Blk-Wht
Blank Moving the cursor with the up-arrow and down-arrow keys, 64b and 64d respectively, to a particular function and depressing the menu key will allow selection of that particular function. Selection of the "vertical" or "horizontal" functions will either add vertical or horizontal lines to the displayed image or delete the vertical or horizontal lines already being displayed. Similarly, selection of the "vertical:horizontal" function will add both vertical and horizontal lines to the image.

Selection of the "datum", "span 1", "span 2" or "span 3" functions enables the operator to move one of four vertical lines or one of four horizontal lines where each function represents one line. Similarly, selection of the "move all" function enables the operator to move all the vertical lines or all the horizontal lines. The horizontal lines are moved by depressing the up-arrow or down-arrow keys 64b and 64d, while the vertical lines are moved by depressing the left-arrow key or right-arrow key 64c and 64e respectively.

Figure 7:
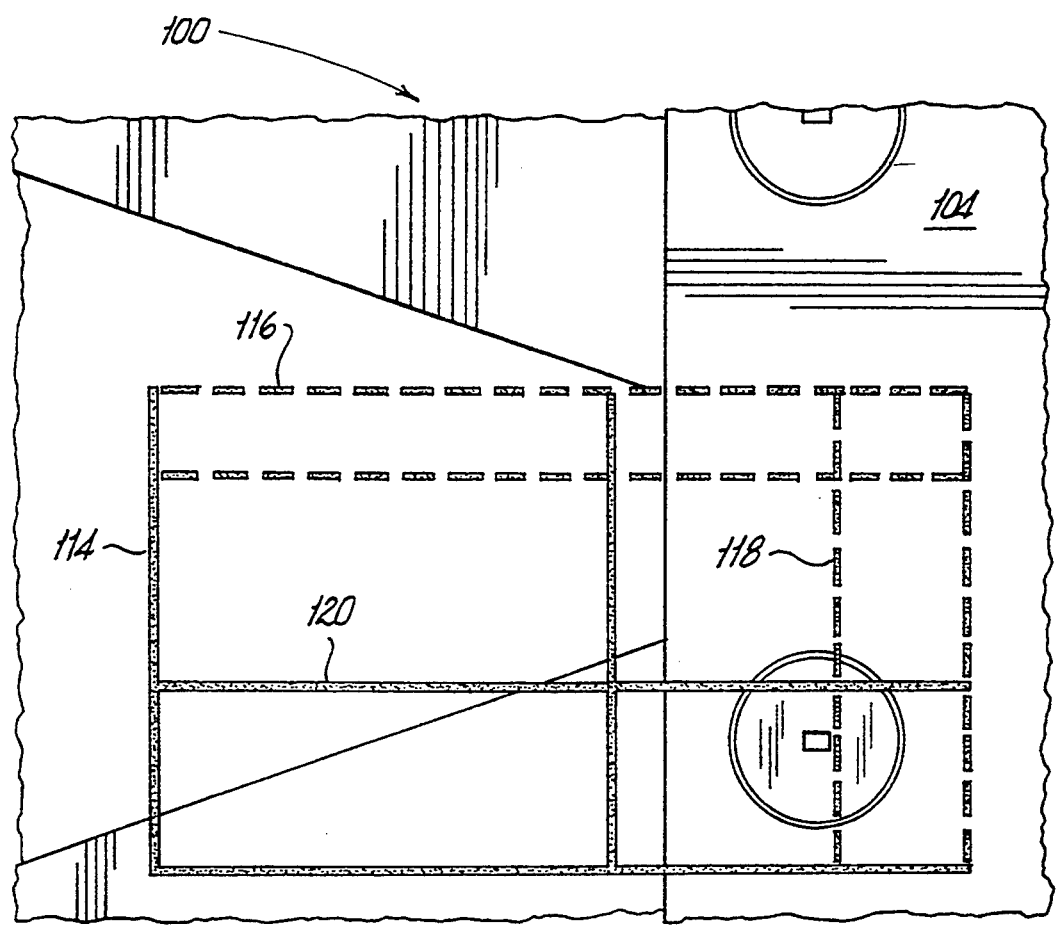
FIG. 7 is a front view of a video display illustrating a partial magnified view of the component support fixture of FIG. 3, having vertical and horizontal lines superimposed thereon for examination and comparative purposes.

Utilizing line generating system 60, there are four vertical and four horizontal lines, two of the four lines are solid lines and the remaining two lines are dashed. Selection of the "line type" function switches the original dashed lines to solid lines and the original solid lines to dashed lines. Selection of the "matt, blk-wht" function allows the operator to lighten or darken the color of the horizontal and vertical lines. Finally, selection of the "blank" function deletes all graphic lines from view. As an operational example, FIG. 7 illustrates a composite image 100, without a component part, wherein horizontal lines 116 and 120 and vertical lines 114 and 118 lines are superimposed onto the video image 104. These horizontal and vertical lines may be moved using the above described functions.

If on the other hand, the preferred enhanced line generating system is utilized the menu may indicate, for example, the following functions:

| Group 1 | Group 2 |
| --- | --- |
| Bar Direction | Bar Direction |
| Line Type | Line Type |
| Color | Color |
| Flip | Flip |
| Line Size | Line Size |
| Move Bar | Move Bar |
| Line 3 | Line 3 |
| Line 2 | Line 2 |
| Line 1 | Line 1 |
| Datum | Datum |
| Rotate Line 3 | Rotate Line 3 |
| Rotate Line 2 | Rotate Line 2 |
| Rotate Line 1 | Rotate Line 1 |
| Rotate Line Datum | Rotate Line Datum |
| Rotate Line Reset | Rotate Line Reset |

Group 1 represents functions which control a first group of four lines and a bar, while Group 2 represents functions which control a second group of four lines and a bar. The functions are the same for each group with the only difference being the lines or bars being manipulated. Therefore, references made to the functions associated with "group 1" will include the equivalent function in "group 2" with the understanding that different lines and/or bars will be affected.

Selection of the "Bar Direction" function will change the orientation of the bar from either vertical or horizontal to either horizontal or vertical respectively.

The "Line Type" function may allow the operator to display the lines and bar, the lines only, the bar only or to blank the lines and bar from the display means.

The "Color" function allows selection of a color for the lines and bar from an assortment of colors.

Selection of the "Flip" function causes the bar to rotate 180 degrees on the common axis. The "Line Size" function increases or decreases the width of the line.

The "Move Bar" function allows the operator to move the bar in either the vertical or horizontal direction respective to the original orientation of the bar. Similarly, selection of the "Line 1", "Line 2", "Line 3" or "Datum" functions allows the operator to move the respective line in either the vertical or horizontal direction depending on the original orientation of the lines.

Figure 8:
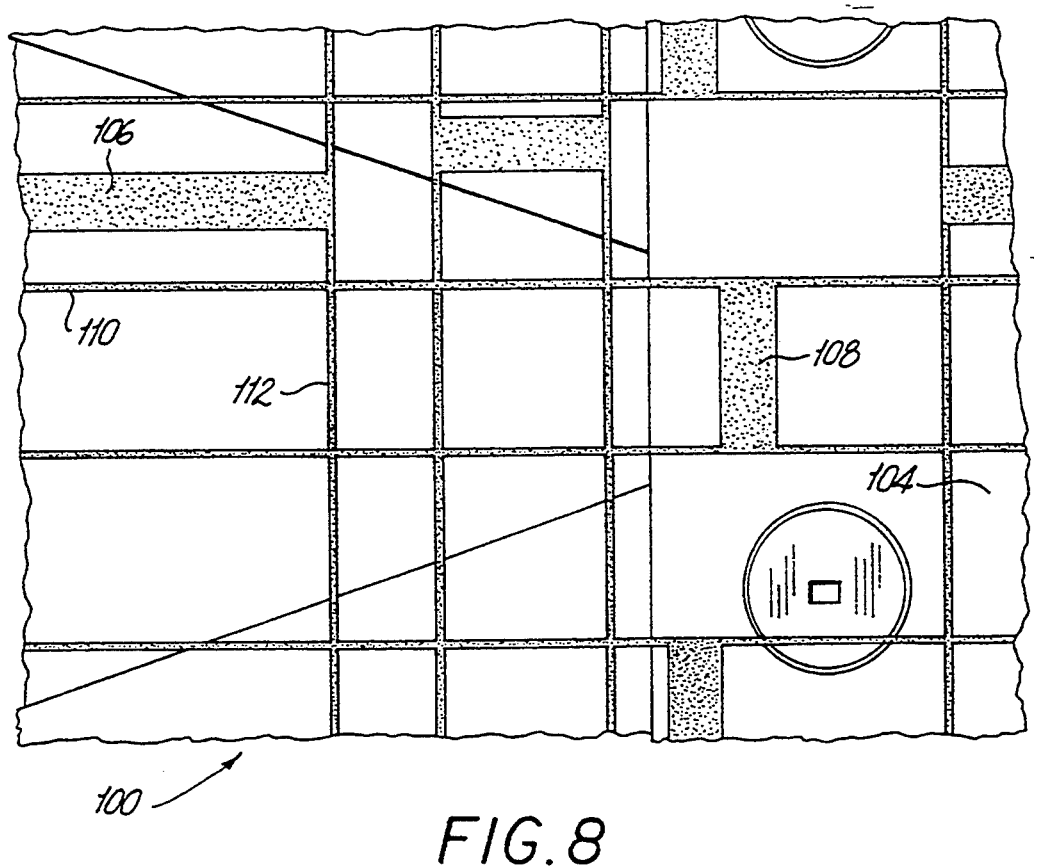
FIG. 8 is a front view of a video display illustrating a partial magnified view of the component support fixture of FIG. 3, having vertical and horizontal lines and bars superimposed thereon for examination and comparative purposes.

Selection of the "Rotate Line 1", "Rotate Line 2," "Rotate Line 3" or "Rotate Line Datum" allows the operator to rotate the respective line a maximum of 180 degrees from its original axis. Finally, selection of the "Rotate Line Reset" will cause any line which has been rotated to reset to its original orientation. As an example, FIG. 8 illustrates a composite image 100, without a component part, wherein horizontal lines 110 combined with vertical bar 108, and horizontal bar 106 combined with vertical lines 112, are superimposed onto the video image 104. These horizontal lines and vertical bar and vertical lines and horizontal bar may be manipulated using the above described functions.

After a reference pattern is set using the line generating system or the enhanced line generating system it remains fixed unless altered by the operator, even if power is removed from the video comparator system.

Referring again to FIG. 6, once the reference pattern is generated, a component part is releasably secured to the component support system 49. Because the setting master has been positioned within the focal plane of the imaging system, it is axiomatic that the now installed component part will be positioned within the focal plane of the imaging system 35. A visual comparison is made of the video image of the component part and superimposed reference pattern. If the operator is simply inspecting the component part, coincidence of the component part image with the reference pattern may satisfy the inspection requirements. However, if the operator is calibrating the component part, failure of the component part image to coincide with the reference pattern requires the operator to adjust the dimensions of the component part to coincide with the reference pattern. Adjusting the dimensions of the component part may be accomplished by actuation of the adjustment system as described above.

Figure 9:
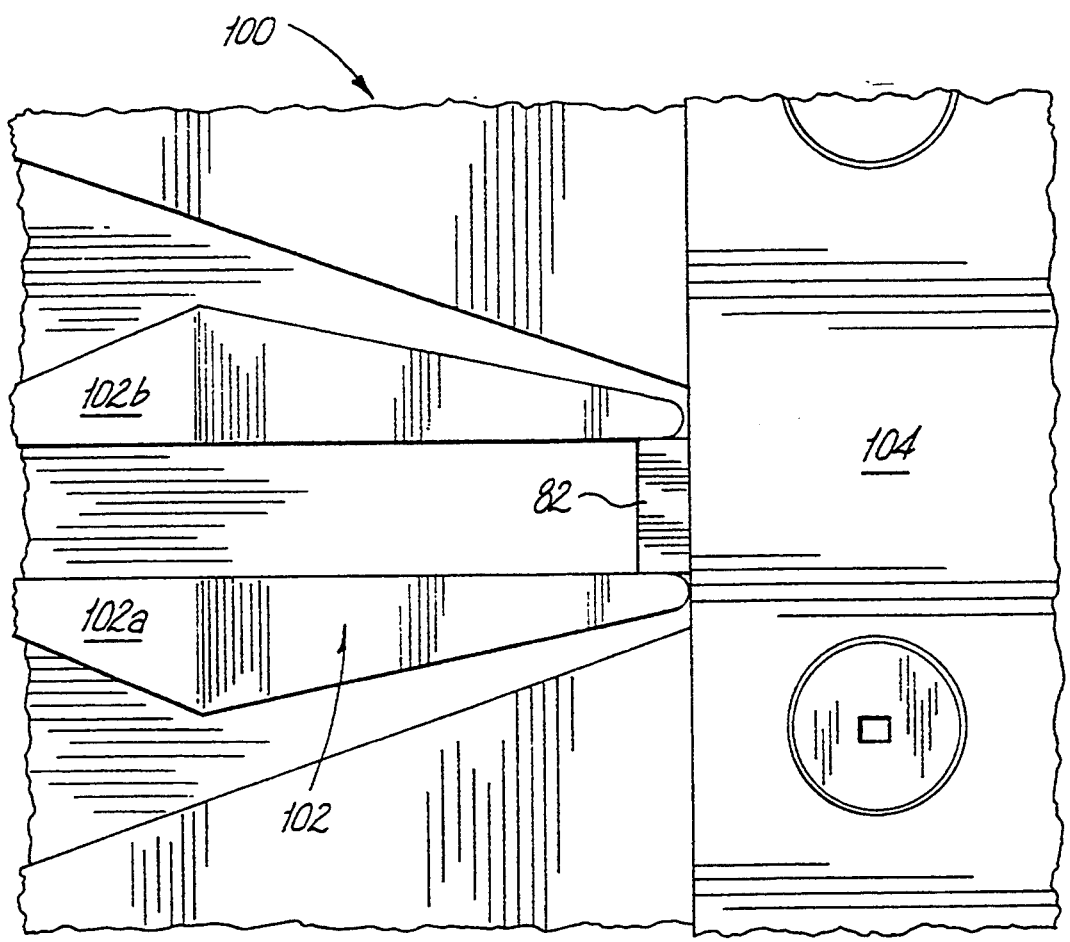
FIG. 9 is a front view of a portion of a video display, illustrating a partial magnified view of the component support fixture of FIG. 3, having a component part secured in position for comparative and adjustment purposes.

Referring now to FIGS. 6 and 9 for illustration purposes, the spacing between jaw 102 of a component part of a surgical device may require calibration and adjustment. To widen the spacing between the jaw 102 the reciprocating flange 82 is utilized. The reciprocating flange 82 is manually inserted into the jaw opening by applying a force to second lever arm 84 in a direction toward the component part. A force is then applied to first lever arm 86 of the adjusting system 78 in an appropriate transverse direction illustrated by arrow "A" in FIG. 6. The applied force is sufficient to cause one member 102a or 102b of the jaw to permanently widen the jaw opening. This procedure is repeated for the other jaw member, if necessary. To close the jaw opening, reciprocating flange 82 is withdrawn from the jaw opening and adjustment system 78 is simply moved in a transverse direction so as to cause either of plates 78a or 78b to engage the outer side surface of either member 102a or member 102b in a direction which causes one of the members (or both) to move inwardly so as to reduce the jaw opening with sufficient force to permanently alter the dimension of the jaw opening.

Once the component part is examined, inspected and/or calibrated or adjusted, it is released from the component support system by releasing the retaining device and extracting the component part.

It will be understood that various modifications can be made to the embodiments of the present invention herein disclosed without departing from the spirit and scope thereof. For example, various sizes of the frame and support means are contemplated, as well as various types of construction materials. Also, various modifications may be made in the configuration of the parts. Additionally, various types of imaging means, display means and line generating means are contemplated. Therefore, the above description should not be construed as limiting the invention, but merely as exemplifications of preferred embodiments thereof. Those skilled in the art will envision other modifications within the scope and spirit of the present invention as defined by the claims appended hereto.

What is claimed is:

1. Video comparator system for inspecting and calibrating a device or component part thereof, which comprises:
   a) frame means;
   b) means releasably attached to said frame means for supporting a device or component part thereof to be inspected and/or calibrated;
   c) imaging means attached to said frame means for generating a video image of the device or component part thereof on video display means; and
   d) means for generating graphic images to be superimposed on said video display means, said graphic images being arrangeable to display and represent predetermined dimensional ranges related to the component part, whereby the device or component part thereof may be compared to said graphic images.

2. The video comparator system according to claim 1, wherein said imaging means comprises:
   a) a video camera;
   b) a lens assembly having magnification means for focusing said video image; and
   c) illumination means for illuminating the focal plane of said lens assembly.

3. The video comparator system according to claim 2, wherein said frame means is significantly rigid to maintain said component securing means and said video imaging means in continuous fixed relationship.

4. The video comparator system according to claim 3, wherein said frame means comprises:
   a) a base member having at least two upright side walls spatially secured thereto; and
   b) an upper platform secured to said side walls.

5. The video comparator system according to claim 4, wherein said component supporting means comprises:
   a) a first member;
   b) component holding means secured to said first member for receiving at least a part of the device or component part thereof;
   c) adjusting means secured to said first member for adjusting the dimensions of the device or component part to coincide with said predetermined dimensional ranges; and
   d) positioning means secured to said first member for positioning the device or component part within the focal plane of said imaging means.

6. The video comparator system according to claim 5, wherein said graphic images comprise at least one horizontal line or bar.

7. The video comparator system according to claim 6, wherein said graphic images comprise at least one vertical line or bar.

8. Video comparator system for inspecting and calibrating component parts, which comprises:
   a) a frame;
   b) imaging means secured to said frame for generating a video image;
   c) line generating means connected to said imaging means for superimposing a graphic line image on said video image thereby generating a composite image;
   d) data entry means connected to said line generating means for altering said graphic line image;
   e) video display means connected to said line generating means for receiving said composite image; and
   f) component support means releasably secured to said frame for releasably supporting a component part and positioning the component part within the focal plane of said imaging means such that said video display means displays the component part.

9. The video comparator system according to claim 8, wherein said imaging means comprises:

a) a video camera;

b) a lens assembly attached to said video camera having a magnification means for focusing said video image; and c) illumination means for illuminating the focal plane of said lens assembly to facilitate image reception by said imaging means and display of said image on said video display means.

10. The video comparator system according to claim 9, wherein said frame is of unitary construction and sufficiently rigid to maintain said component support means and said imaging means in a continuous fixed relationship.

11. The video comparator system according to claim 10, wherein said frame comprises:

a) a base member having at least two upright side walls spatially secured thereto; and b) an upper platform secured to said side walls.

12. The video comparator system according to claim 11, wherein said imaging means is secured to said upper platform such that said focal plane of said imaging means is substantially parallel to said base member.

13. The video comparator system according to claim 12, wherein said component support means comprises:

a) a first lower member;

b) component holding means secured to said first lower member for releasably supporting the component part;

c) adjusting means secured to said lower member for adjusting the dimensions of the component part to coincide with predetermined dimensions defined by a setting master adapted to be releasably supported by said component support means; and d) positioning means secured to said lower member for positioning the component part within said focal plane of said imaging means.

14. The video comparator system according to claim 13, wherein said component support means further comprises an intermediate member positioned between said lower member and said component holding means.

15. The video comparator system according to claim 14, wherein said intermediate member is also positioned between said lower member and said adjusting means.

16. The video comparator system according to claim 15, wherein said adjusting means comprises:

a) a guide member secured to said intermediate member; and b) a slide arm slidably secured to said guide member.

17. The video comparator system according to claim 16, wherein said component holding means includes a retaining means for releasably securing the component part to said component holding means.

18. The video comparator system according to claim 17, wherein said graphic line image comprises at least one horizontal line.

19. The video comparator system according to claim 18, wherein said graphic line image comprises at least one vertical line.

20. The video comparator system according to claim 19, wherein said data entry means includes keys adapted for controlling the up and down movement of said at least one horizontal line.

21. The video comparator system according to claim 20, wherein said data entry means includes keys adapted for controlling the left and right movement of said at least one vertical line.

22. The video comparator system according to claim 21, wherein said data entry means includes menu select means.

23. The video comparator system according to claim 22, wherein said data entry means is a keypad.

24. The video comparator system according to claim 23, wherein said video display means is a video monitor.

25. The video comparator system according to claim 24, wherein said line generating means is secured to said frame.

26. The video comparator system according to claim 25, wherein said magnification means comprises a magnification lens of approximately at least 0.5 magnification.

27. The video comparator system according to claim 25, wherein said magnification means comprises magnification lens of at least approximately 0.67 magnification.

28. The video comparator system according to claim 25, wherein said magnification means comprises a zoom lens of approximately 6.5 magnification.

29. The video comparator system according to claim 25, wherein said illumination means is connected to said lens assembly.

30. The video comparator system according to claim 25, wherein said illumination means comprises:

a) a light source;

b) a ring light for dispersing light generated by said light source; and c) an optical cable for transmitting light from said light source to said ring light.

31. The video comparator system according to claim 24, wherein said line generating means is connected to said data entry means by a data link.

32. Video comparator system for inspecting and calibrating component parts, which comprises:

a) a frame;

b) video imaging means secured to said frame for generating a video image;

c) line generating means connected to said imaging means for superimposing a graphic line image on said video image thereby generating a composite image;

d) a keypad connected to said line generating means for altering said graphic line image;

e) a video monitor connected to said graphic line generator for receiving said composite image; and f) component support means releasably secured to said frame for receiving a component part and positioning the component part within the focal plane of said imaging means such that said video monitor displays the component part.

33. The video comparator system according to claim 32, wherein said video imaging means comprises:

a) a video camera;

b) a lens assembly attached to said video camera, having magnification means for focusing said video image; and c) illumination means for illuminating the focal plane of said lens assembly.

34. The video comparator system according to claim 33, wherein said illumination means comprises:

a) a light source;

b) a ring light for dispersing light generated by said light source; and c) an optical cable for transmitting light from said light source to said ring light.

35. The video comparator system according to claim 34, wherein said frame is of unitary construction and sufficiently rigid to maintain said component support means and said video imaging means in continuous fixed relationship.

36. The video comparator system according to claim 35, wherein said frame comprises:
 a) a base having at least two upright side walls spatially secured thereto; and
 b) an upper platform secured to said side walls.

37. Video comparator system for inspecting and calibrating component parts, which comprises:
 a) a frame;
 b) imaging means secured to said frame for generating a video image;
 c) enhanced line generating means secured to said frame for superimposing graphic line and bar images on said video image thereby generating a composite image;
 d) data entry means connected to said enhanced line generating means for altering said graphic line and bar images;
 e) display means secured to said frame for receiving said composite image; and
 f) component support means releasably secured to said frame for releasably supporting a component part and positioning the component part within the focal plane of said imaging means such that said display means displays the component part.

38. The video comparator system according to claim 37, wherein said graphic line and bar images comprise at least one vertical bar, at least one vertical line, at least one horizontal bar and at least one horizontal line.

39. The video comparator system according to claim 38, wherein said enhanced line generating means stores the display in a memory.

40. The video comparator system according to claim 39, wherein said data entry means includes keys adapted for controlling the left and right movement of said at least one vertical line and bar images.

41. The video comparator system according to claim 40, wherein said data entry means includes keys adapted for controlling the up and down movement of said at least on horizontal line and bar images.

42. The video comparator system according to claim 41, wherein said data entry means rotates said graphic line and bar images at an angle from the normal axis.

43. The video comparator system according to claim 42, wherein said enhanced line generating means is connected to said data entry means by a data link.

44. A method of displaying component parts for inspection purposes, comprising:
 a) releasably supporting a setting master to component support means, said setting master being of predetermined dimensions which represent the corresponding dimensions of a component part;
 b) positioning said component support means within the focal plane of imaging means so as to display said setting master on video display means;
 c) superimposing a graphic line image on said displayed setting master image;
 d) adjusting said graphic line image to outline the dimensions of said setting master thereby providing a reference pattern representative of said setting master;
 e) releasably securing a component part to the component support means;
 f) comparing the dimensions of the component part with the reference pattern; and
 g) removing the component part from said component support means.

45. The method according to claim 44, wherein the step of releasably securing the component part to said component support means is accomplished by retaining means.

46. A method of displaying component parts for calibration and adjusting purposes, comprising:
 a) generating a reference pattern on a video display;
 b) releasably securing a component part to a component support jig;
 c) comparing the dimensions of the component part with said reference pattern;
 d) adjusting the dimensions of the component part to coincide with said reference pattern; and
 e) removing the component part from said component support means.

47. The method according to claim 46, wherein generating a reference pattern comprises:
 a) releasably securing a setting master to component support means;
 b) positioning said component support means within the focal plane of imaging means for displaying said setting master on said video display means;
 c) superimposing graphic line image on said video displayed setting master image; and
 d) adjusting said graphic line image to align with the dimensions of said setting master thereby providing a reference pattern representative of said setting master.

48. The method according to claim 47, wherein the component part is releasably secured to said component support means by a retaining means.

49. The method according to claim 48, wherein the dimensions of the component part are adjusted by an adjusting means secured to said component support means.

* * * * *